United States Patent
Chen et al.

(10) Patent No.: US 7,415,631 B2
(45) Date of Patent: Aug. 19, 2008

(54) BACKUP-TYPE POWER SUPPLY SYSTEM

(75) Inventors: Tsung-Chun Chen, Taipei Hsien (TW); Yung-Hsin Huang, Taipei Hsien (TW); Chih-Fu Fan, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 455 days.

(21) Appl. No.: 11/330,079

(22) Filed: Jan. 12, 2006

(65) Prior Publication Data

US 2007/0162771 A1 Jul. 12, 2007

(51) Int. Cl.
*G06F 11/00* (2006.01)

(52) U.S. Cl. .......................................... 714/14; 714/22

(58) Field of Classification Search ................... 714/14, 714/13, 22, 23; 307/2, 52, 75; 323/202; 363/65, 67
See application file for complete search history.

(56) References Cited

U.S. PATENT DOCUMENTS

| | | | | |
|---|---|---|---|---|
| 4,576,043 A | * | 3/1986 | Nguyen | 73/195 |
| 5,551,305 A | * | 9/1996 | Farchi et al. | 73/861.04 |
| 5,741,977 A | * | 4/1998 | Agar et al. | 73/861.04 |
| 5,751,564 A | * | 5/1998 | Dien | 363/37 |
| 6,385,024 B1 | * | 5/2002 | Olson | 361/87 |
| 6,525,855 B1 | * | 2/2003 | Westbrook et al. | 398/168 |
| 2003/0016418 A1 | * | 1/2003 | Westbrook et al. | 359/145 |
| 2005/0214607 A1 | * | 9/2005 | Imahashi et al. | 429/23 |
| 2005/0285584 A1 | * | 12/2005 | Kwan | 323/283 |
| 2006/0139974 A1 | * | 6/2006 | Dermark | 363/65 |

* cited by examiner

*Primary Examiner*—Dieu-Minh Le
(74) *Attorney, Agent, or Firm*—Muncy, Geissler, Olds & Lowe, PLLC

(57) ABSTRACT

A backup-type power supply system aims to integrate power output according to different potentials through different power supply modules. Each power supply module includes backup-type N+1 power supply devices and an independent power balance unit to output power in a balanced fashion so that users can add the power supply module of independent potential according requirements. Thereby transformation power loss of the power supply devices can be reduced. The power supply devices can be designed with different specifications and dimensions corresponding to different electronic devices.

10 Claims, 3 Drawing Sheets

BACKUP-TYPE POWER SUPPLY SYSTEM

FIELD OF THE INVENTION

The present invention relates to a backup-type power supply system and particularly to a backup-type power supply system that allows malfunction or interrupt occurred to a portion of power supply modules while the rest of the power supply modules still able to function and output power to maintain operation of rear end electronic devices.

BACKGROUND OF THE INVENTION

The conventional backup-type power supply system for an industrial computer usually adopts a N+M combination mode to maintain continuous operation of the industrial computer without interrupting power supply. In general, "N" means the number of power supply devices that can jointly meet the total power requirement of the industrial computer, and "M" means the number of power supply devices allowable in the malfunction condition. The commonly adopted design is N+1 architecture. In the event that one of the power supply devices malfunctions, the system generates an alarm signal to alert operators to perform repairs or replacement.

The present power supply device mostly adopts a design of signal input power and multiple output power at varying potentials. The common output potentials are 12V, 5V and 3.3V. Each power supply device has to distribute same amount of power. Hence the conventional power supply devices mostly have same specifications and dimensions. The specifications can be divided into 1U-4U. However, as the technologies of multimedia and Internet advance, power requirements of electronic devices increase significantly. But the technology of the power supply devices does not change very much. They merely adopt transformer elements with improved material characteristics to increase output power, such as 600 W-750 W. In practice, the power supply devices are constrained by the standard specifications and have limited power enhancement. As the number of power supply devices can be installed on a chassis usually is restricted, to meet the fast increasing power requirement of the electronic devices becomes difficult or even impossible. Moreover, the present requirement of enhancing power for electronic devices often focuses on a selected potential, especially 12V. But the generally adopted technique for enhancing the power of the power supply device takes the average enhancement approach rather than an independent upgrade targeting a selected potential. As a result, the enhanced power could still not meet the actual requirement of the electronic devices.

SUMMARY OF THE INVENTION

The primary object of the present invention is to solve the aforesaid disadvantages. The present invention provides a power supply system that supplies power through different power supply modules in an integrated fashion according to different power potentials. Each power supply module includes backup-type N+1 power supply devices and an independent power balance unit to supply power in a balanced manner. Hence users can increase the power supply module of an independent potential according to the requirement of the electronic device. As a result, the transformation power loss of the power supply device can be reduced. And the power supply devices can be designed with different specifications and dimensions in responding to different electronic devices.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
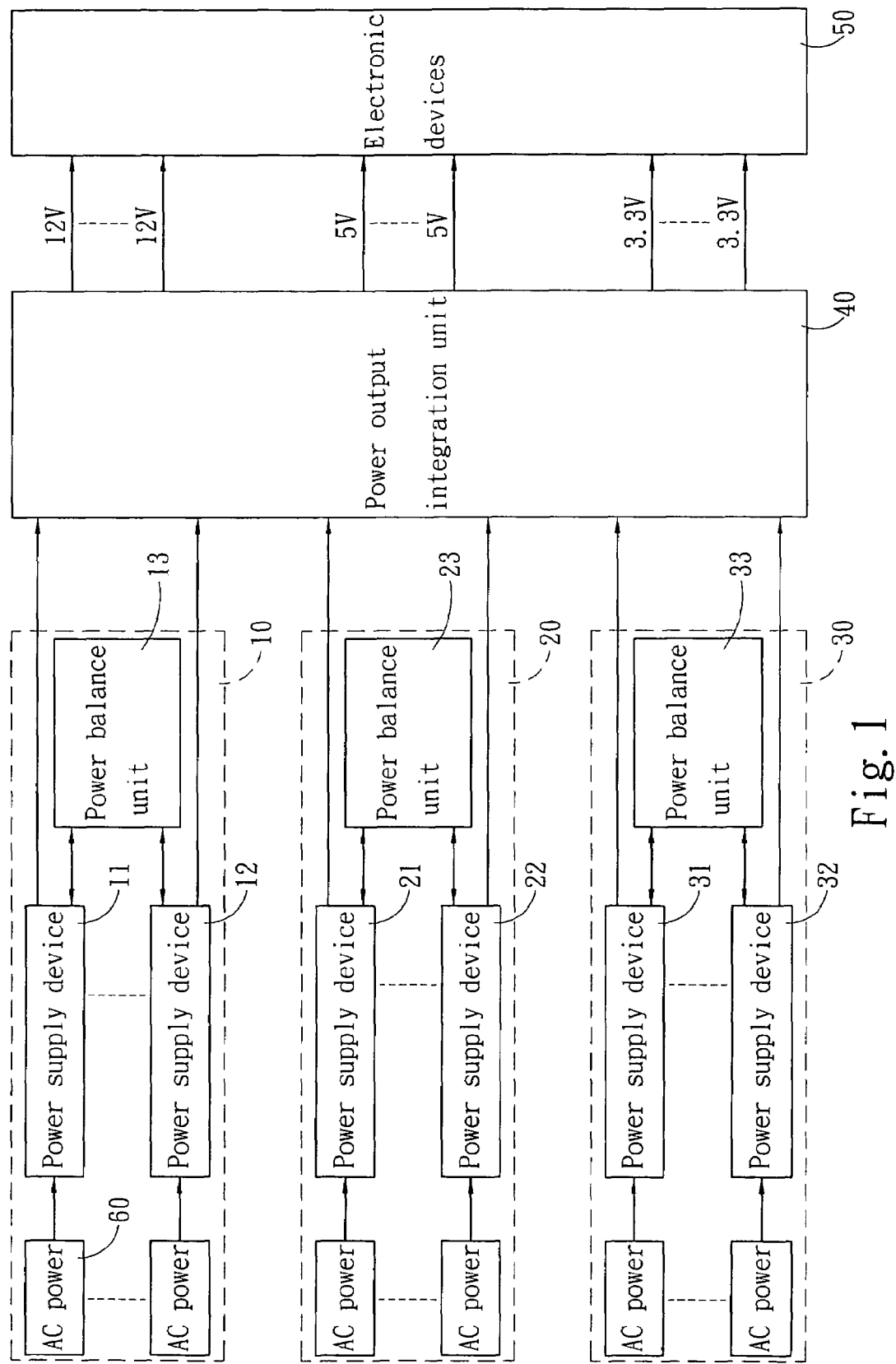
FIG. 1 is a schematic circuit block diagram of a first embodiment of the present invention.

Please referring to FIG. 1, the backup-type power supply system of the invention mainly includes a power output integration unit 40 to integrate power output by the backup-type power supply system to rear end electronic devices 50. The power output integration unit 40 may consist of one circuit board or multiple circuit boards according to the required wiring layout of the total output power. The backup-type power supply system outputs power through a plurality of power supply modules 10, 20 and 30. The power supply modules 10, 20 and 30 have respectively N+1 power supply devices 11 and 12, 21 and 22, and 31 and 32 that are connected to the power output integration unit 40, and a power balance unit 13, 23 and 33 that are electrically connected to the power supply devices 11 and 12, 21 and 22, and 31 and 32. The power balance units 13, 23 and 33 provide respectively a loading power balance mode to allow the N+1 power supply devices 11 and 12, 21 and 22, and 31 and 32 of the individual power supply modules 10, 20 and 30 to form a backup-type module. The invention includes at least two power supply modules 10, 20 and 30. In order to conform to the commonly used potentials, this embodiment includes three power supply modules 10, 20 and 30 as an example to facilitate discussion. The power supply modules 10, 20 and 30 respectively output power at a first potential, a second potential and a third potential.

In the invention, the first potential, second potential and third potential are different. According to the commonly used specifications, the first potential, second potential and third potential are respectively 12V, 5A and 3.3V. As the voltage difference of 5V and 3.3V is smaller, in this invention 5V and 3.3V may be integrated into one of the power supply module 10, 20 or 30. Due to each of the power supply devices 11 and 12, 21 and 22, and 31 and 33 output a same or proximate potential, transformation power loss resulting from different winding during voltage transformation can be reduced. In addition, during operation of the electronic devices 50, each of the power supply devices 11 and 12, 21 and 22, and 31 and 32 outputs a same or similar potential, hence voltage fluctuations caused by voltage differences can be prevented. Moreover, the specifications and dimensions of the power supply devices 11 and 12, 21 and 22, and 31 and 32 can be designed according to different potentials of the power used by the electronic devices 50 and may be different without constraints. The power supply devices 11 and 12, and 21 and 22 to provide power of 5V and 3.3V that are used less frequently can be shrunk and integrated to become smaller sizes. Thus installation space can be used more effectively. And a spare space can be reserved in advance to improve the expandability of the power supply devices 11 and 12, and 21 and 22.

Figure 2:
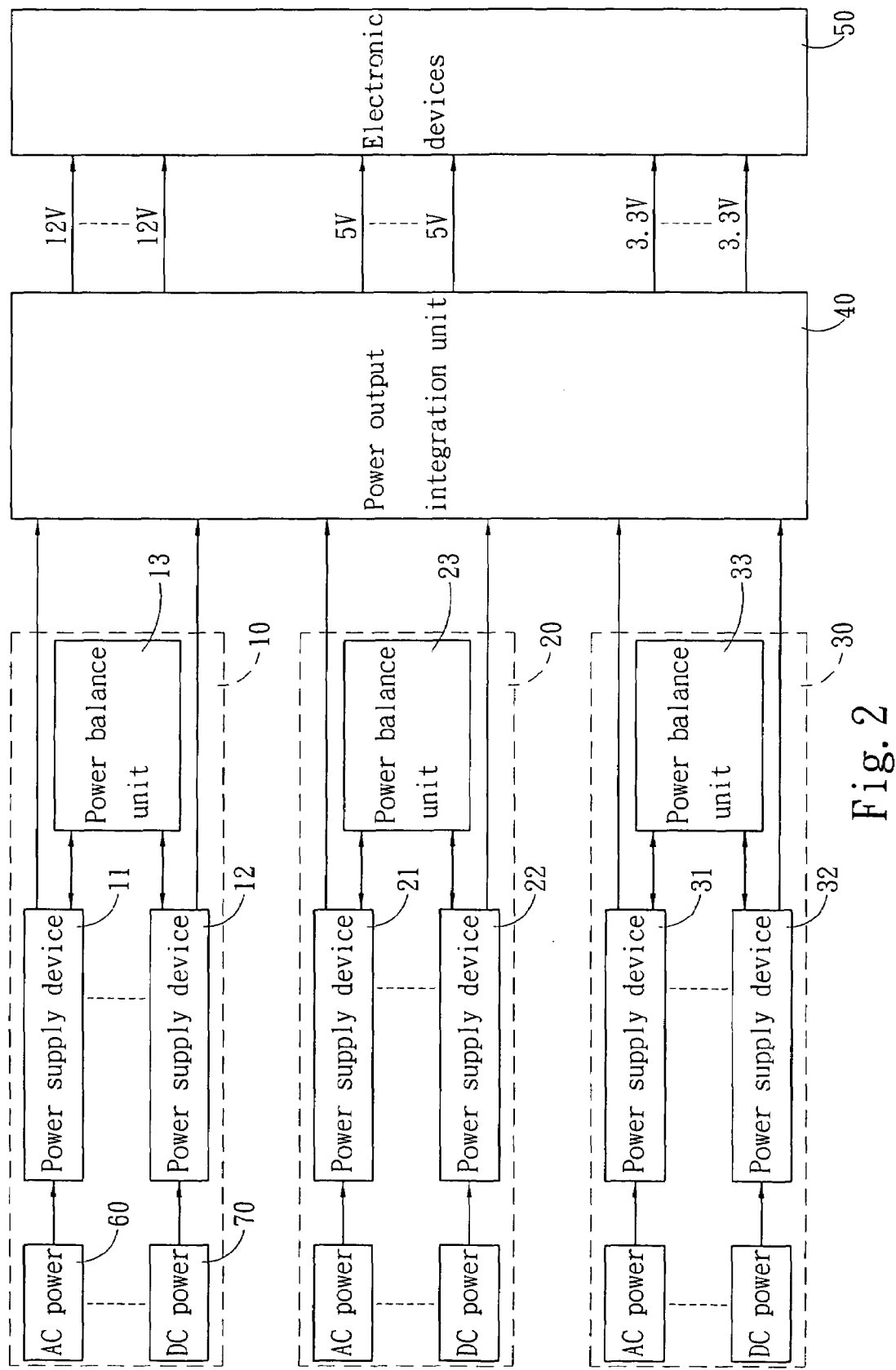
FIG. 2 is a schematic circuit block diagram of a second embodiment of the present invention.
Figure 3:
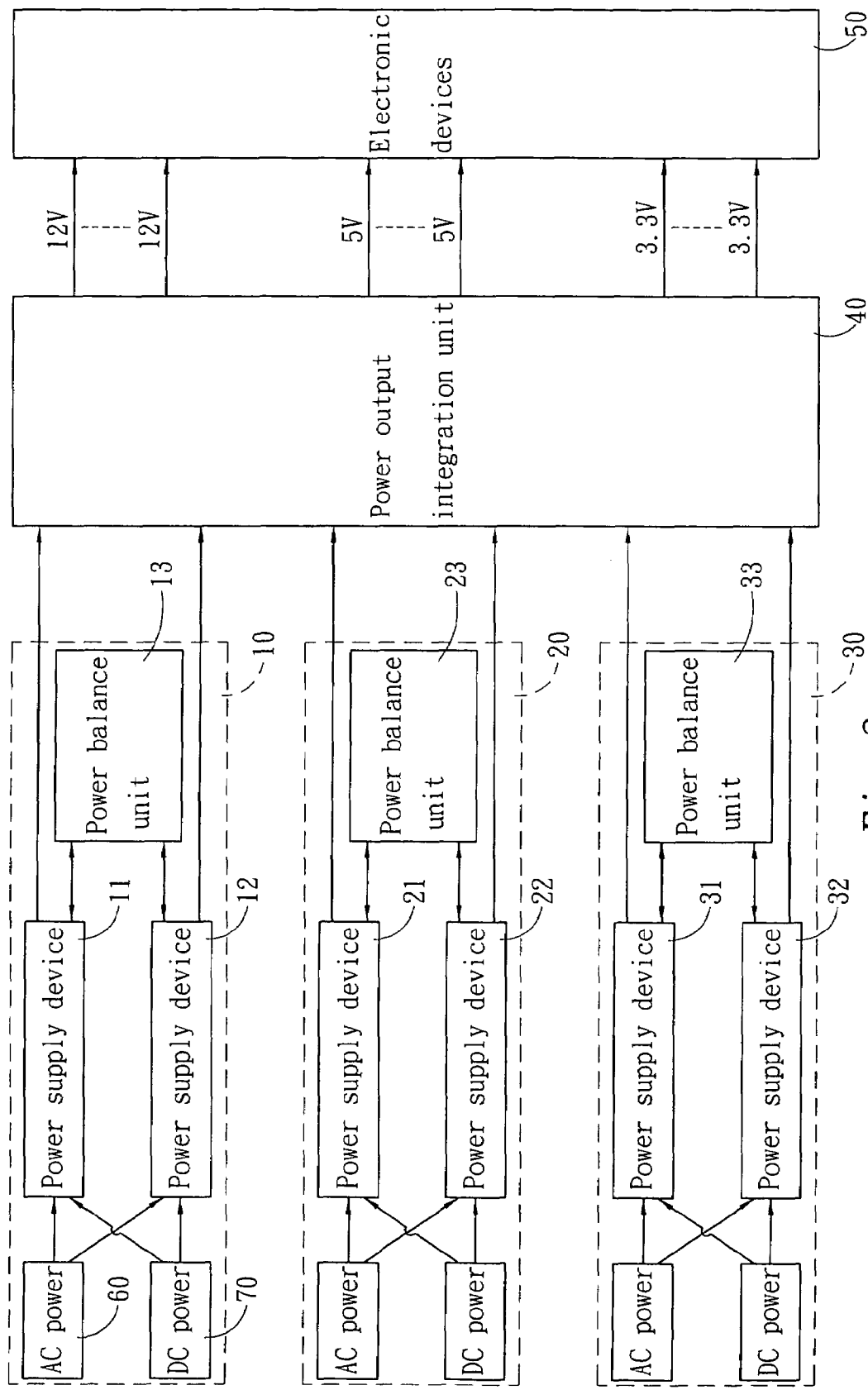
FIG. 3 is a schematic circuit block diagram of a third embodiment of the present invention.

Furthermore, according to the invention, input power of the backup-type power supply system can be an AC power 60 or DC power 70 of the same source. The source of the input power may also be different so as to maintain a non-stop power supply condition. For instance, in FIG. 1 the input power is the AC power 60 provided by different city power. FIG. 2 shows another embodiment in which a portion of the power supply devices 11, 21 and 31 are supplied by the AC power 60 of city power, while other portion of the power supply devices are supplied by the DC power 70 from a non-stop power system. FIG. 3 illustrates yet another embodiment in which the power supply devices 11 and 12, 21 and 22, and 31 and 32 receive simultaneously the input from the AC power 60 and DC power 70. By means of the combination and distribution schemes previously discussed, the invention can maintain a steady power output in any conditions.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A backup-type power supply system, comprising:
   a power output integration unit;
   at least one first power supply module which outputs first power at a first potential and includes at least N+1 power supply devices connecting to the power output integration unit and a first power balance unit electrically connecting to the N+1 power supply devices, the first power balance unit providing a first loading power balance mode to make the N+1 power supply devices to become a first backup-type module; and
   at least one second power supply module which outputs second power at a second potential different from the first potential and includes at least N+1 power supply devices connecting to the power output integration unit and a second power balance unit electrically connecting to the N+1 power supply devices, the second power balance unit providing a second loading power balance mode to make the N+1 power supply devices to become a second backup-type mode.

2. The backup-type power supply system of claim 1, wherein the first potential is DC12V and the second potential is DC5V and DC3.3V.

3. The backup-type power supply system of claim 1 further including a third power supply module which outputs third power at a third potential different from the first potential and the third potential and includes N+1 power supply devices connecting to the power output integration unit and a third power balance unit electrically connecting to the N+1 power supply devices.

4. The backup-type power supply system of claim 3, wherein the first potential is DC12V, the second potential is DC5V and the third potential is DC3.3V.

5. The backup-type power supply system of claim 3, wherein the N+1 power supply devices of the third power supply module are connected to a same source to receive electric power.

6. The backup-type power supply system of claim 3, wherein the N+1 power supply devices of the third power supply module are connected to different sources to receive electric power.

7. The backup-type power supply system of claim 1, wherein the N+1 power supply devices of the first power supply module are connected to a same source to receive electric power.

8. The backup-type power supply system of claim 1, wherein the N+1 power supply devices of the first power supply module are connected to different sources to receive electric power.

9. The backup-type power supply system of claim 1, wherein the N+1 power supply devices of the second power supply module are connected to a same source to receive electric power.

10. The backup-type power supply system of claim 1, wherein the N+1 power supply devices of the second power supply module are connected to different sources to receive electric power.

* * * * *